US012565121B2

(12) United States Patent
Ameur

(10) Patent No.: US 12,565,121 B2
(45) Date of Patent: Mar. 3, 2026

(54) VEHICLE CONTROL UNIT FOR POWER MANAGEMENT OF A VEHICLE

(71) Applicant: Huawei Technologies Co., Ltd., Shenzhen (CN)

(72) Inventor: Amir Ameur, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 18/639,112

(22) Filed: Apr. 18, 2024

(65) Prior Publication Data

US 2024/0270122 A1 Aug. 15, 2024

Related U.S. Application Data

(63) Continuation of application No. PCT/EP2021/078949, filed on Oct. 19, 2021.

(51) Int. Cl.
*B60L 58/25* (2019.01)
*B60L 53/20* (2019.01)
(Continued)

(52) U.S. Cl.
CPC .............. *B60L 58/25* (2019.02); *B60L 53/20* (2019.02); *B60L 53/62* (2019.02); *B60L 53/66* (2019.02); *B60L 53/68* (2019.02); *B60L 58/27* (2019.02); *H01M 10/615* (2015.04); *H01M 10/625* (2015.04); *H01M 10/63* (2015.04);
(Continued)

(58) Field of Classification Search
CPC .......... B60L 58/25; B60L 53/20; B60L 53/68; B60L 58/27; B60L 53/62; B60L 53/66;

B60L 2210/30; B60L 2240/545; H01M 10/615; H01M 10/625; H01M 10/63; H01M 10/6571; H01M 2220/20; H02J 7/007194

See application file for complete search history.

(56) References Cited

U.S. PATENT DOCUMENTS 9,834,106 B2 * 12/2017 Min ........................ B60L 58/12
10,661,663 B2 * 5/2020 Zhang .................... B60L 58/27
(Continued)

FOREIGN PATENT DOCUMENTS

CN 111029667 A 4/2020

OTHER PUBLICATIONS

Shankar Mohan et al: "An Energy-Optimal Warm-Up Strategy for Li-Ion Batteries and Its Approximations", IEEE Transactions on Control Systems Technology, vol. 27, No. 3, May 2019, total 16 pages.

*Primary Examiner* — Hussein Elchanti
(74) *Attorney, Agent, or Firm* — Conley Rose, P.C.

(57) ABSTRACT

A vehicle control unit (VCU) for power management of a vehicle receives battery temperature data. The battery temperature data is indicative of a battery temperature of a battery of the vehicle. Based on the battery temperature compared to a temperature threshold, the VCU determines a power split for splitting a charge power provided by a charging system. The power split indicates a split of the charge power into a first part for charging the battery by the charging system and into a second part for heating the battery by a heating system. The VCU transmits information about the first part of the charge power to the charging system and information about the second part of the charge power to the heating system.

20 Claims, 7 Drawing Sheets

(51) Int. Cl.

| | |
|---|---|
| *B60L 53/62* | (2019.01) |
| *B60L 53/66* | (2019.01) |
| *B60L 53/68* | (2019.01) |
| *B60L 58/27* | (2019.01) |
| *H01M 10/615* | (2014.01) |
| *H01M 10/625* | (2014.01) |
| *H01M 10/63* | (2014.01) |
| *H01M 10/6571* | (2014.01) |
| *H02J 7/00* | (2006.01) |

(52) U.S. Cl.
CPC ... *H01M 10/6571* (2015.04); *H02J 7/007194* (2020.01); *B60L 2210/30* (2013.01); *B60L 2240/545* (2013.01); *H01M 2220/20* (2013.01)

(56) References Cited

U.S. PATENT DOCUMENTS

| | | | | |
|---|---|---|---|---|
| 2008/0036425 | A1* | 2/2008 | Tashiro | H01M 10/615 |
| | | | | 320/154 |
| 2017/0225586 | A1* | 8/2017 | Zhang | B60L 58/18 |
| 2018/0079318 | A1* | 3/2018 | Ha | B60L 53/66 |
| 2019/0001828 | A1* | 1/2019 | Ko | H01M 10/6571 |
| 2020/0185928 | A1 | 6/2020 | Ha | |
| 2021/0031643 | A1* | 2/2021 | Wang | H01M 10/6567 |
| 2021/0139014 | A1* | 5/2021 | Zhao | B60W 30/188 |
| 2022/0314835 | A1* | 10/2022 | Altaf | B60L 58/16 |
| 2023/0219458 | A1* | 7/2023 | Altaf | B60L 58/12 |
| | | | | 320/126 |
| 2024/0270122 | A1* | 8/2024 | Ameur | B60L 58/27 |

* cited by examiner

VEHICLE CONTROL UNIT FOR POWER MANAGEMENT OF A VEHICLE

CROSS-REFERENCE TO RELATED APPLICATIONS

This is a continuation of International Patent Application No. PCT/EP2021/078949 filed on Oct. 19, 2021, which is hereby incorporated by reference in its entirety.

TECHNICAL FIELD

The disclosure relates to a vehicle control unit (VCU) and corresponding method for power management of a vehicle, a vehicle charging control system and a network device of a cloud network. In particular, the disclosure relates to the field of electric vehicles and high-voltage (HV) battery charging at low temperatures. Further, this disclosure relates to time-optimal HV battery charging at low temperature using external charger and external heater.

BACKGROUND

HV battery charging at low temperature is a problem faced by original equipment manufacturers (OEMs) and electric vehicle (EV) users, due to power limitation imposed by cell chemistry. The cells exhibit higher resistance at low temperature which limits the amount of charging current that can be supplied to the battery. Another problem is lithium plating which can be exacerbated by high charging current at low temperatures. Cell manufacturers usually provide information about power derating which can be expressed as charging/discharging power or current limits curves versus cell temperature. On system level, battery management system (BMS) suppliers can integrate this information and provide power derating curves on pack level.

EV users living in cold regions who desire to charge their cars overnight using a home charger or an electric vehicle supply equipment (EVSE) face the problem of limited power charging which is usually imposed by BMS power limits. The user reaches the car in the following day, and the battery shows a low state-of-charge (SoC) level.

SUMMARY

It is an object of this disclosure to provide a solution for efficiently charging a battery of an electric vehicle at low temperatures.

In particular, it is an object of this disclosure to provide a concept for HV battery charging at low temperature using a heating system and an on-board charger (OBC) connected to EVSE.

This object is achieved by the features of the independent claims. Further implementation forms are apparent from the dependent claims, the description and the figures.

EVs are equipped with heating systems that can use electric energy to provide heat to the vehicle components including the battery. By increasing the battery temperature, the power limits increase, and more charging current can be fed to the cells.

The disclosure describes a mechanism for utilizing a heating process preceding the charging process in an optimal way in order to achieve the highest amount of energy transfer to the battery and therefore to achieve the highest possible SoC.

The solution presented in this disclosure corresponds to the solution of an optimal control problem whose goal is to find an optimal power split $\lambda$ of the charge power supplied by the OBC between the power provided to the battery for charging and the power consumed by the thermal system to provide heat to the battery.

The solution is based on the following information: battery self-heating model depending on different charge currents and/or powers, battery temperature curves based on the amount of heat transferred to the battery, battery open circuit voltage (OCV) versus SoC curve, and power consumption by thermal system versus heat generated by the thermal system.

In order to describe the disclosure in detail, the following terms, abbreviations and notations will be used:

OEM: original equipment manufacturer;

EV: electric vehicle;

VCU: vehicle control unit;

BMS: battery management system;

HV: high-voltage;

LV: low-voltage;

SoC: state of charge;

SoH: state of health;

OCV: open circuit voltage;

OBC: on-board charger;

DC: direct current;

AC: alternating current; and

EVSE: electric vehicle supply equipment.

In this disclosure, electric vehicles, VCUs and BMSs are described. An EV is a vehicle that uses one or more electric motors for propulsion. It can be powered autonomously by a battery. EVs include, but are not limited to, road and rail vehicles, surface and underwater vessels, electric aircraft and electric spacecraft.

A VCU is the supervisory controller for electric or hybrid vehicles. VCUs act as domain controller for electric or hybrid vehicles. The VCU reads sensor signals, for example, brakes, high-voltage interlock loop (HVIL) or charger connection. Then, it acts to balance the system energy, optimize torque, control the motor, HV battery pack and the on-board charging system up to charger lock.

A BMS is any electronic system that manages a rechargeable battery (cell or battery pack), such as by protecting the battery from operating outside its safe operating area, monitoring its state, calculating secondary data, reporting that data, controlling its environment, authenticating it and/or balancing it.

According to a first aspect, the disclosure relates to a VCU for power management of a vehicle, wherein the VCU is configured to receive battery temperature data, the battery temperature data being indicative of a battery temperature of a battery of the vehicle, based on the battery temperature compared to a temperature threshold, determine a power split for splitting a charge power provided by a charging system, wherein the power split indicates a split of the charge power into a first part configured for charging the battery by the charging system and into a second part configured for heating the battery by a heating system, and transmit information about the first part of the charge power to the charging system and information about the second part of the charge power to the heating system.

Such a VCU provides an efficient solution for charging a battery of an electric vehicle at low temperatures. The VCU can detect the global optimal power split according to the optimal control solution. The VCU allows to perform application-independent charging based on the optimal charging policy that is independent from OBC maximum power, battery chemistry or thermal system type. The VCU can be advantageously extended to multi-objective optimization, e.g., optimizing final temperature with boundary conditions on SoC, cost functions with different weighting factors for final SoC and final temperature.

The battery temperature data including the battery temperature can be received from the BMS which is connected to all the cells of the battery pack and receives from each module voltage and temperature information that are monitored through sensors. The BMS has also a current sensor for monitoring the current in the battery pack. The BMS communicates to VCU the minimum and maximum cell temperature, as well as SoC, SoH, etc.

The temperature threshold is referring to the temperature below which a charging at full power cannot happen. An example of this would be 10° C. (degrees Celsius), but it is highly dependent on the cell manufacturer and the cell topology inside the battery (e.g., how many cells are connected in series or in parallel).

In an exemplary implementation of the VCU, the power split comprises a power split factor indicating a first part of the charge power configured for charging the battery and a second part of the charge power configured for heating the battery.

This provides the advantage that the power split factor can be easily used for computing the first part and the second part of the charge power.

In an exemplary implementation of the VCU, the power split is based on a charging policy indicating a power split based on a charging state of the battery and the battery temperature over a charging time.

This provides the advantage that the charging policy can be determined offline and solutions of the optimal charging policy for different initial conditions can be efficiently requested, e.g., from the cloud where the optimal charging policy is stored.

The optimal charging policy refers to following the obtained power split from solving the optimization problem.

In an exemplary implementation of the VCU, the power split is based on at least one of the following: a thermal model of the battery, a derating model of the battery, a power consumption model of the heating system, a relationship between generated heat by the heating system and a corresponding power consumption, and an electrical model of the battery.

This provides the advantage that a variety of information is included for determining the optimal power split. By using all this information, the global optimal power split can be determined.

In an exemplary implementation of the VCU, the charging policy is configured to obtain a maximum charging state of the battery over a charging time interval.

This provides the advantage that the maximum charging state can be flexible determined based on the desired charging time interval, e.g., based on a desired time to depart.

The maximum charging state at the end of the charging session can be obtained by defining a cost function for the optimizer. An exemplary cost function can be for example 100%-SoC (tf). SoC(tf) is the SoC at the end of optimization horizon which corresponds to the SoC at the end of charging session. The optimizer's task is to minimize this function while looking for the optimal power split $\lambda$. After solving this problem, the power split by which the SoC at tf is maximized can be determined.

In an exemplary implementation of the VCU, the VCU is configured to receive the power split from a memory section storing one or more predefined values, wherein the memory section is configured to store the power split for successive charging times.

This provides the advantage that the power split according to the optimal solution can be determined offline and can be stored in the memory section, e.g., in a lookup-table for easy access.

In an exemplary implementation of the VCU, the VCU is configured to download the memory section from a network device of a cloud network.

This provides the advantage, that the VCU can be released from processing the optimization problem. Thus, the computational complexity of the VCU in terms of processing power can be reduced.

In an exemplary implementation of the VCU, the VCU is configured to transmit a current vehicle state to the network device of the cloud network, and receive the memory section for the current vehicle state from the network device of the cloud network, wherein the current vehicle state comprises at least one of the following: the battery temperature, a charging state of the battery, a maximum power provided by the charging system, a time to departure.

This provides the advantage that the network device can compute or determine the optimal solution of the power split based on the specific requirements of the vehicle which are given by the vehicle states. Thus, the VCU can save processing power.

In an exemplary implementation of the VCU, the power split is based on a derating function of the battery based on the battery temperature.

This provides the advantage that the optimal power split can be precisely determined when using the derating function of the battery. The derating function is a function that gives a relationship between the battery temperature and the maximum charging power or current it can receive. This relationship may depend on the cell chemistry and the safety margin chosen by the system designer.

In an exemplary implementation of the VCU, the power split is based on a voltage of the battery based on a charging state of the battery.

This provides the advantage that the optimal power split can be accurately determined by considering the voltage of the battery that can vary with the charging state of the battery.

The nominal voltage of a battery depends on the charging state of the battery and also on the current because of internal resistance and capacitance of the battery. When the battery is fully charged, the voltage provided by the battery can be higher than an empty battery. There is a relation between the charging state of the battery and the provided voltage of the battery which can be described by a specific function. By considering these relationships, the optimal power split can be efficiently determined.

In an exemplary implementation of the VCU, the power split is based on at least one of the following information: a battery self-heating model indicating the battery temperature depending on a charging current or power, a battery temperature model indicating the battery temperature based on an amount of heat transferred to the battery, a battery voltage-to-charge model indicating an open circuit voltage of the battery versus a charging state of the battery, and a power consumption model indicating a power consumption of the heating system versus a heat generated by the heating system.

This provides the advantage that due to the use of these various battery models, the power split can be accurately determined resulting in an optimal charging of the battery.

According to a second aspect, the disclosure relates to a vehicle charging control system, comprising an OBC configured to convert alternating current (AC) power provided by an AC input into direct current (DC) charge power for charging a battery of a vehicle, a heating system comprising a heating element for heating the battery of the vehicle and a thermal controller configured to control a heating power of the heating element for heating the battery, and a VCU for power management of the vehicle according to any of the preceding claims.

Such a vehicle charging control system provides an efficient solution for charging the battery of an electric vehicle at low temperatures. The global optimal power split according to the optimal control solution can be easily detected. Application-independent charging can be performed based on the optimal charging policy that is independent from OBC maximum power, battery chemistry or thermal system type.

In an exemplary implementation of the vehicle charging control system, the VCU is configured to transmit a first signaling message to the OBC, wherein the first signaling message indicates the first part configured for charging the battery, and the VCU is configured to transmit a second signaling message to the thermal controller, wherein the second signaling message indicates the second part configured for heating the battery.

This provides the advantage that both units, i.e., OBC and thermal controller are informed about their respective splitting part of the charge power and can apply the corresponding power splitting.

In an exemplary implementation of the vehicle charging control system, the VCU is configured to receive a third signaling message from a BMS, the third signaling message indicating the battery temperature.

This provides the advantage that the VCU is informed about the battery temperature from the BMS and can apply this actual battery temperature to determine the optimal power split that depends on the actual battery temperature.

In an exemplary implementation of the vehicle charging control system, the VCU is configured to transmit a current vehicle state to a network device of a cloud network, and receive information about the power split for the current vehicle state from the network device of the cloud network, wherein the current vehicle state comprises at least one of the following: the battery temperature, a charging state of the battery, a maximum power provided by the OBC, a time to departure.

This provides the advantage that the optimality problem can be solved by the network device. This saves processing power for the VCU. The VCU can be designed at low processing power.

According to a third aspect, the disclosure relates to a method for power management of a vehicle, the method comprising receiving battery temperature data, the battery temperature data being indicative of a battery temperature of a battery of the vehicle, based on the battery temperature compared to a temperature threshold, determining a power split for splitting a charge power provided by a charging system, wherein the power split indicates a split of the charge power into a first part configured for charging the battery by the charging system and into a second part configured for heating the battery by a heating system, and transmitting information about the first part of the charge power to the charging system and information about the second part of the charge power to the heating system.

Such a method provides the same advantages as the VCU described above, i.e., an efficient solution for charging the battery of an electric vehicle at low temperatures. The global optimal power split according to the optimal control solution can be easily detected by this method. When using this method, application-independent charging can be performed based on the optimal charging policy that is independent from OBC maximum power, battery chemistry or thermal system type.

According to a fourth aspect, the disclosure relates to a network device of a cloud network, wherein the network device is configured to receive a current vehicle state from a VCU of a vehicle, the current vehicle state comprising battery temperature data, the battery temperature data being indicative of a battery temperature of a battery of the vehicle, based on the battery temperature compared to a temperature threshold, transmit a memory section storing one or more predefined values to the VCU, wherein the memory section is configured to store a power split for splitting a charge power provided by a charging system, wherein the power split indicates a split of the charge power into a first part configured for charging the battery by the charging system and into a second part configured for heating the battery by a heating system.

Such a network device provides an efficient solution for charging the battery of an electric vehicle at low temperatures. A further advantage is that the processing of the optimal power split can be performed by the network device which saves processing power at the VCU, thereby saving the battery and extending battery life.

The term "based on the battery temperature compared to a temperature threshold" means that the battery shows a derating behavior limiting the maximum charging current.

The derating curve is an input to an optimization task as described above with respect to the first aspect.

In an exemplary implementation of the network device, the vehicle state further comprises at least one of the following information: a charging state of the battery, a maximum power provided by the charging system for charging the battery, a time to departure of the vehicle.

This provides the advantage that the network device can accurately determine the optimal power split when these data of charging state, maximum power and time to departure can be considered.

In an exemplary implementation of the network device, the power split is based on a charging policy indicating a power split based on a charging state of the battery and the battery temperature over a charging time.

This provides the advantage that the charging policy can be determined offline by the network device and solutions of the optimal charging policy for different initial conditions can be efficiently provided to the VCU.

In an exemplary implementation of the network device, the network device is configured to determine an estimated vehicle state of the vehicle based on applying the charging policy to an initial vehicle state received from the vehicle controller, determine a deviation between the estimated vehicle state and a current vehicle state received from the VCU, and update the charging policy if the deviation exceeds a threshold value.

This provides the advantage that the charging policy can be updated from time to time if the vehicle states change.

The comparison between current vehicle state and estimated vehicle state can be performed at regular time intervals, for example every 15 minutes (min). A new vehicle state is received after that time interval. In one example, after 15 min the initial vehicle state is replaced by the current vehicle state. 15 min is only one example. This can be calibrated by the system developer or system design.

According to a fifth aspect, the disclosure relates to a computer program product including computer executable code or computer executable instructions that, when executed, causes at least one computer to execute the method according to the third aspect described above.

The computer program product may run on a VCU as described above with respect to the first aspect or on any controller or processor performing power management.

According to a sixth aspect, the disclosure relates to a computer-readable medium, storing instructions that, when executed by a computer, cause the computer to execute the method according to the third aspect described above. Such a computer readable medium may be a non-transient readable storage medium. The instructions stored on the computer-readable medium may be executed by a controller or a processor, e.g., by the VCU according to the first aspect.

BRIEF DESCRIPTION OF THE DRAWINGS

Further embodiments of the disclosure will be described with respect to the following figures.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the disclosure. The following detailed description, therefore, is not to be taken in a limiting sense, and the scope of the disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless noted otherwise.

Figure 1:
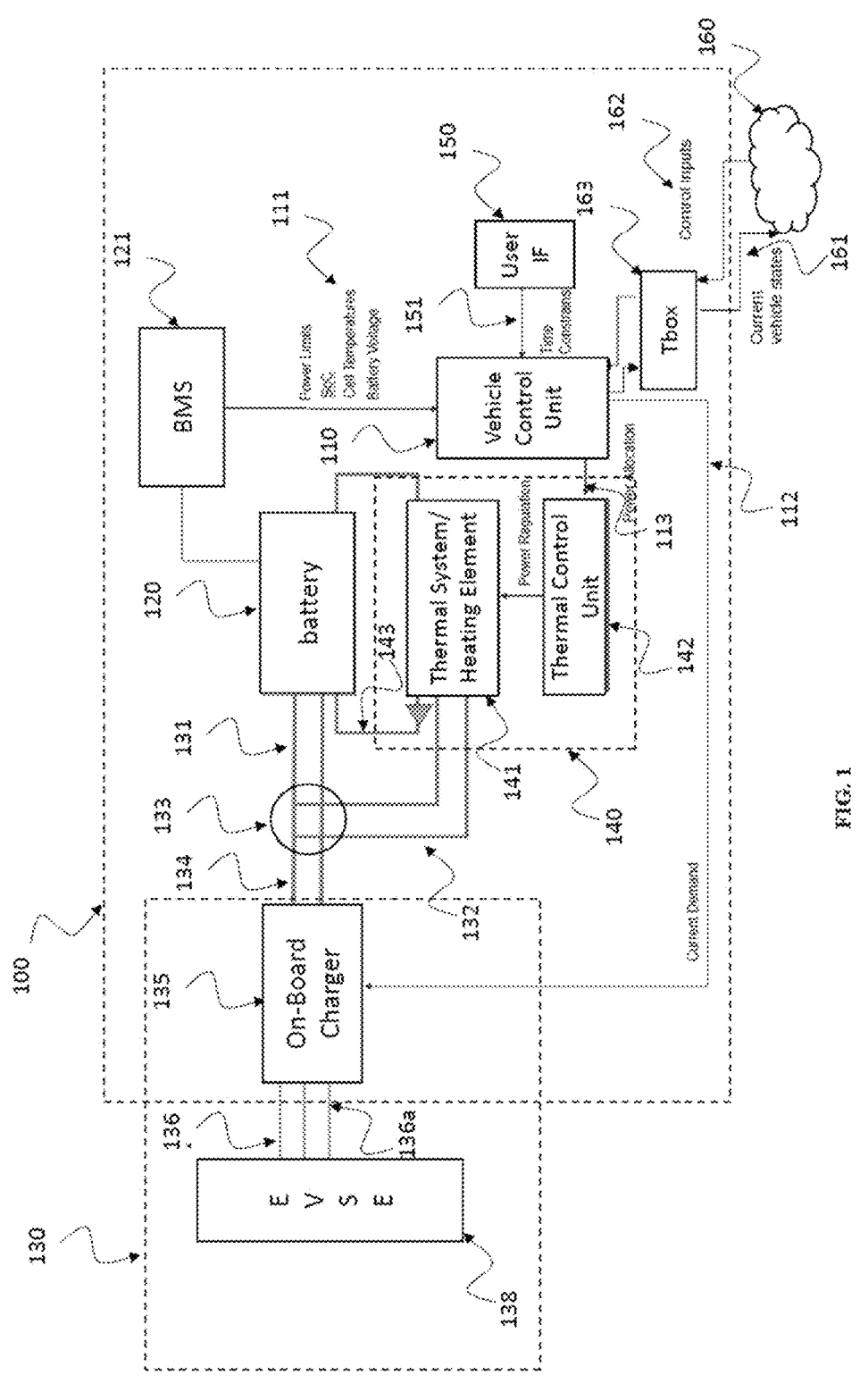
FIG. 1 shows a block diagram of a vehicle charging control system according to the disclosure.

FIG. 1 shows a block diagram of a vehicle charging control system 100 according to the disclosure.

1) The vehicle charging control system 100 includes the following blocks:

2) OBC 135: The OBC 135 represents the AC/DC converter with maximum output DC power. The OBC 135 is connected to the HV battery 120 on the DC link and enables the HV charging. On the other end the OBC 135 is connected to the EVSE 138 that is an AC charging station with maximum output AC power with single phase or 3-phase, usually placed external to the vehicle.

3) Thermal system/heating element 141: The application of the thermal system 141 in this disclosure is limited to the heating function to warm up the battery 120. The heating element 141 may have a power consumption of continuous (e.g., heat pump) or discrete nature (positive-temperature-coefficient (PTC) heater) and it can be coupled with auxiliary consumers that facilitate the heat transfer to the battery 120. In this disclosure the heating element 141 is considered at system level, where relationships between input electrical power and output heat are modeled.

4) VCU 110: The VCU 110 represents the domain controller for HV power management. It allocates limits for power consumption for the thermal system 141 and sets current demand for the onboard charger 135.

5) HV Battery 120 with minimum and maximum operating voltage, SoC versus OCV curves at different temperatures. The HV battery 120 represents the battery 120 for driving the electric vehicle.

6) Tbox 163: The Tbox or T-Box represents the device for downloading and uploading sampled data to the cloud 160. The cloud 160 is located external to the vehicle.

7) Thermal control unit 142: The thermal control unit 142 represents the controller for regulating thermal power consumption.

8) User interface 150: the user interface 150 represents the interface for setting the desired departure time.

The solution described in FIG. 1 is based on the following information: battery self-heating model depending on different charge currents/powers, battery temperature curves based on the amount of heat transferred to the battery, battery OCV vs SoC curve, and power consumption by thermal system 141 versus heat generated by the thermal system 141.

In the following, the vehicle charging control system 100 is described in more detail.

The vehicle charging control system 100 comprises an OBC 135 configured to convert AC power 136 provided by an AC input 136a into DC charge power 134 for charging a battery 120 of a vehicle. The AC input 136a can be connected to an EVSE, i.e., a supply unit external to the vehicle. Both, EVSE 138 and OBC 135 form a charging system 130 for charging the battery 120. In an alternative implementation, the EVSE 138 may be a supply unit inside the vehicle, i.e., inside the vehicle charging control system 100, respectively.

The vehicle charging control system 100 comprises a heating system 140 comprising a heating element 141 for heating the battery 120 of the vehicle and a thermal control unit (controller) 142 configured to control a heating power of the heating element for heating 143 the battery 120. The heating system 140 can be placed inside the vehicle, i.e., inside the vehicle charging control system 100, respectively. In an alternative implementation, the heating system 140 can be placed outside the vehicle as an external heating system that can be placed in proximity to the battery, e.g., manually.

The vehicle charging control system 100 comprises a VCU 110 for power management of the vehicle.

The VCU 110 is configured to receive battery temperature data which is indicative of a battery temperature 111 of the battery 120 of the vehicle. The battery temperature data may be received from the BMS 121.

The VCU 110 is configured to determine a power split 133 for splitting a charge power 134 provided by the charging system 130, based on the battery temperature 111 compared to a temperature threshold. The temperature threshold may be a temperature threshold below which the temperature is specified as a cold temperature for which the power split can be performed.

The power split 133 indicates a split of the charge power 134 into a first part 131 configured for charging the battery 120 by the charging system 130 and into a second part 132 configured for heating the battery 120 by the heating system 140.

The VCU 110 is configured to transmit information 112 about the first part 131 of the charge power 134 to the charging system 130 and information 113 about the second part 132 of the charge power 134 to the heating system 140.

This information 112, 113 can be directly transmitted to the charging system 130 and heating system 140 or indirectly via another electronic or electric component. For example, this information 112, 113 can be stored in a memory or in the cloud and the charging system 130 and heating system 140 may have access to the memory or cloud for receiving this information 112, 113.

The battery temperature data including the battery temperature can be received from the BMS 121 as shown in FIG. 1 which is connected to all the cells of the battery pack (i.e., the battery 120) and receives from each module voltage, and temperature information that are monitored through sensors. The BMS 121 has also a current sensor for monitoring the current in the battery pack. The BMS 121 can communicate to VCU 110 the minimum and maximum cell temperature, as well as SoC, SoH . . . etc.

The temperature threshold is referring to the temperature below which a charging at full power cannot happen. An example of this would be 10° C., but it is highly dependent on the cell manufacturer and the cell topology inside the battery (e.g., how many cells are connected in series or in parallel). Alternative temperature thresholds can be 0° to 20° C., for example, in steps of 1° C., for example.

Figure 2:
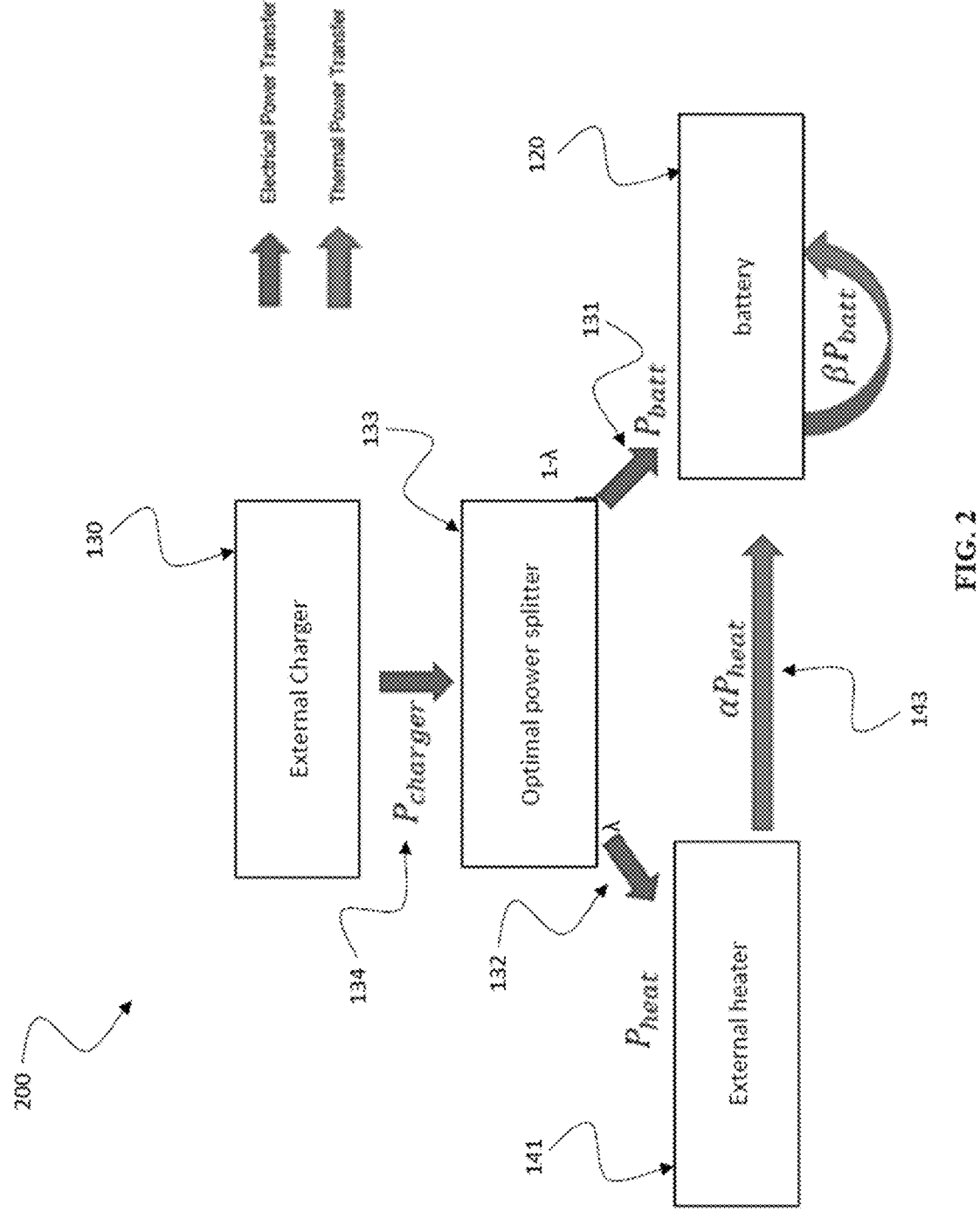
FIG. 2 shows a schematic diagram illustrating an optimal power split according to the disclosure.

The power split 133 may comprise a power split factor, e.g., the factor A as shown in FIG. 2, indicating a first part of the charge power 134 configured for charging the battery 120 and a second part of the charge power 134 configured for heating the battery 120.

The power split 133 can be based on a charging policy indicating a power split 133 based on a charging state of the battery 120 and the battery temperature 111 over a charging time.

The charging policy aims to find an optimal power split for performing a maximum charging of the battery. An optimal charging policy refers to following the obtained power split from solving the optimization problem. At each time step/interval the VCU 110 requests the heating system 140 (via thermal control unit 142) to operate at the λ times power of the charger. The λ is the solution of the optimization and changes based on the time step size used while solving the problem, e.g. every 30 seconds, 1 minute, . . . , etc.

Figure 3:
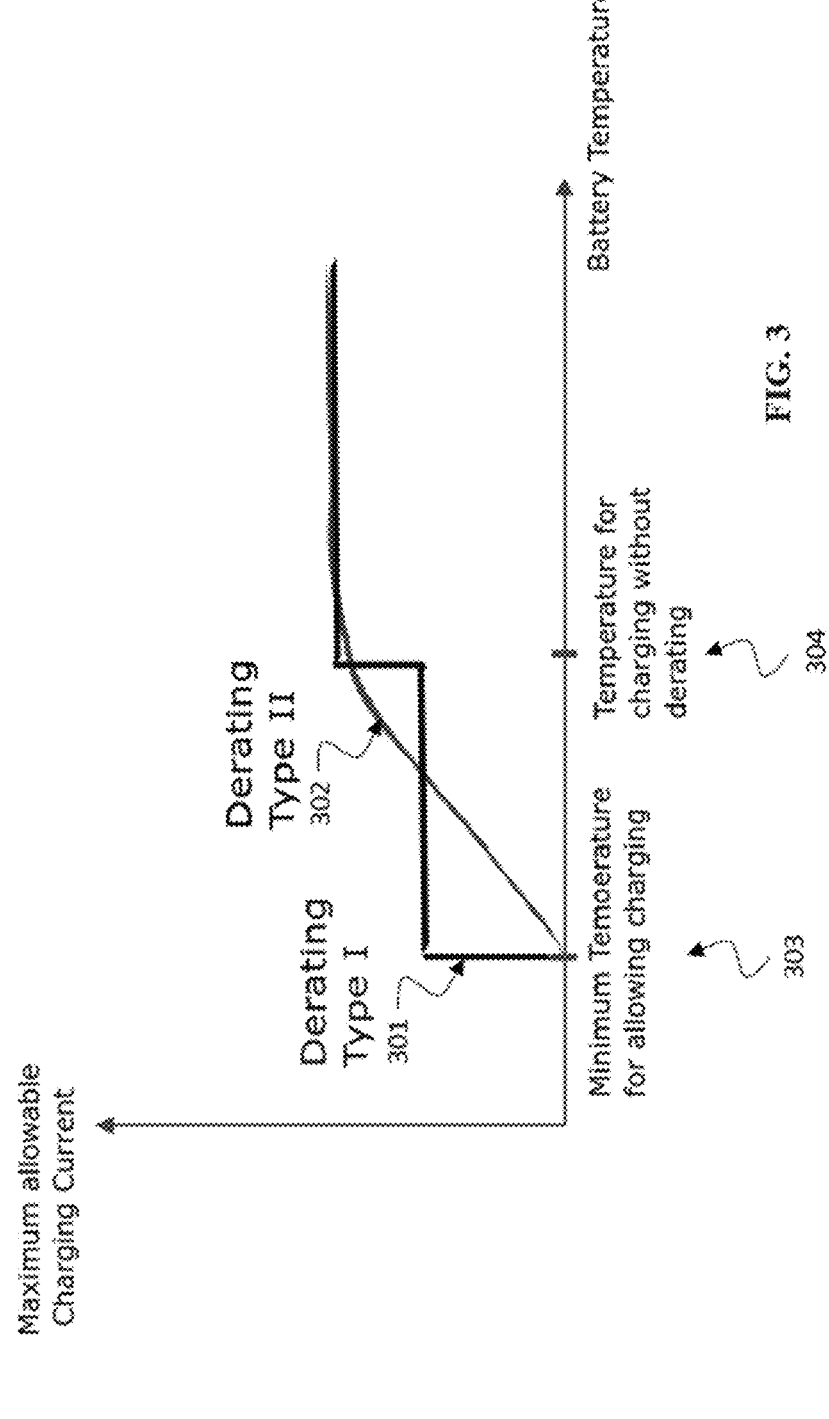
FIG. 3 shows a schematic diagram illustrating two examples of power derating characteristics for HV battery with respect to temperature.

The power split 133 may be based, for example, on at least one of the following: a thermal model of the battery 120, a derating model 301, 302 of the battery 120, e.g., as shown in FIG. 3, a power consumption model of the heating system 140, a relationship between generated heat by the heating system 140 and a corresponding power consumption, and an electrical model of the battery 120. An illustration of these different models is shown and described with respect to FIG. 7.

The thermal model of the battery may include the following: a) battery heat generation based on charging current and b) battery temperature development based on received heating power.

The derating model of the battery describes the maximum charge current based on temperature, e.g., according to the derating curves 301, 302 shown in FIG. 3.

The power consumption model of the heating system can be determined under different conditions.

The electrical model of the battery describes the relationship between SoC current and voltage.

The electrical model of the battery determines the SoC and the voltage.

The thermal model of the battery determines the temperature change of the battery.

The model of the heater determines the power consumption and the generated heat. There is no general model for this because it's highly dependent on the chosen thermal system.

The derating model determines the maximum current that the battery can receive.

All these models interact with each other as described below with respect to FIG. 7, due to the following reasons:

The voltage and SoC change with the charging current. The temperature of the battery changes with generated heat of the heating element and the internal resistance. If the temperature of the battery changes, the maximum amount of current it can receive will change based on the derating curve. The heat generated by the heating element depends on the amount of power allocated by the VCU. The amount of power allocated to the heating element is the solution of the optimization or implicitly the power split between heater and battery charge.

The charging policy may be configured to obtain a maximum charging state of the battery 120 over a charging time interval.

The maximum charging state at the end of the charging session can be obtained by defining a cost function for the optimizer, for example the following cost function: C=100%-SoC (tf). SoC(tf) is the SoC at the end of optimization horizon which corresponds to the SoC at the end of charging session. The optimizer's task is to minimize this function while looking for the optimal power split λ. After solving this problem, the power split can be found with which the SoC at tf is maximized. The cost function is defined as difference of 100% SoC and final SoC, so maximizing the final SoC will lead to minimizing the cost function.

The VCU 110 may comprise a user interface 150 configured to receive the charging time interval as time constraints 151 from a user input. For example, the user can set a desired departure time by using the user interface 150. The charging time interval can be the time difference between a current time and the desired departure time set by the user.

Figure 5:
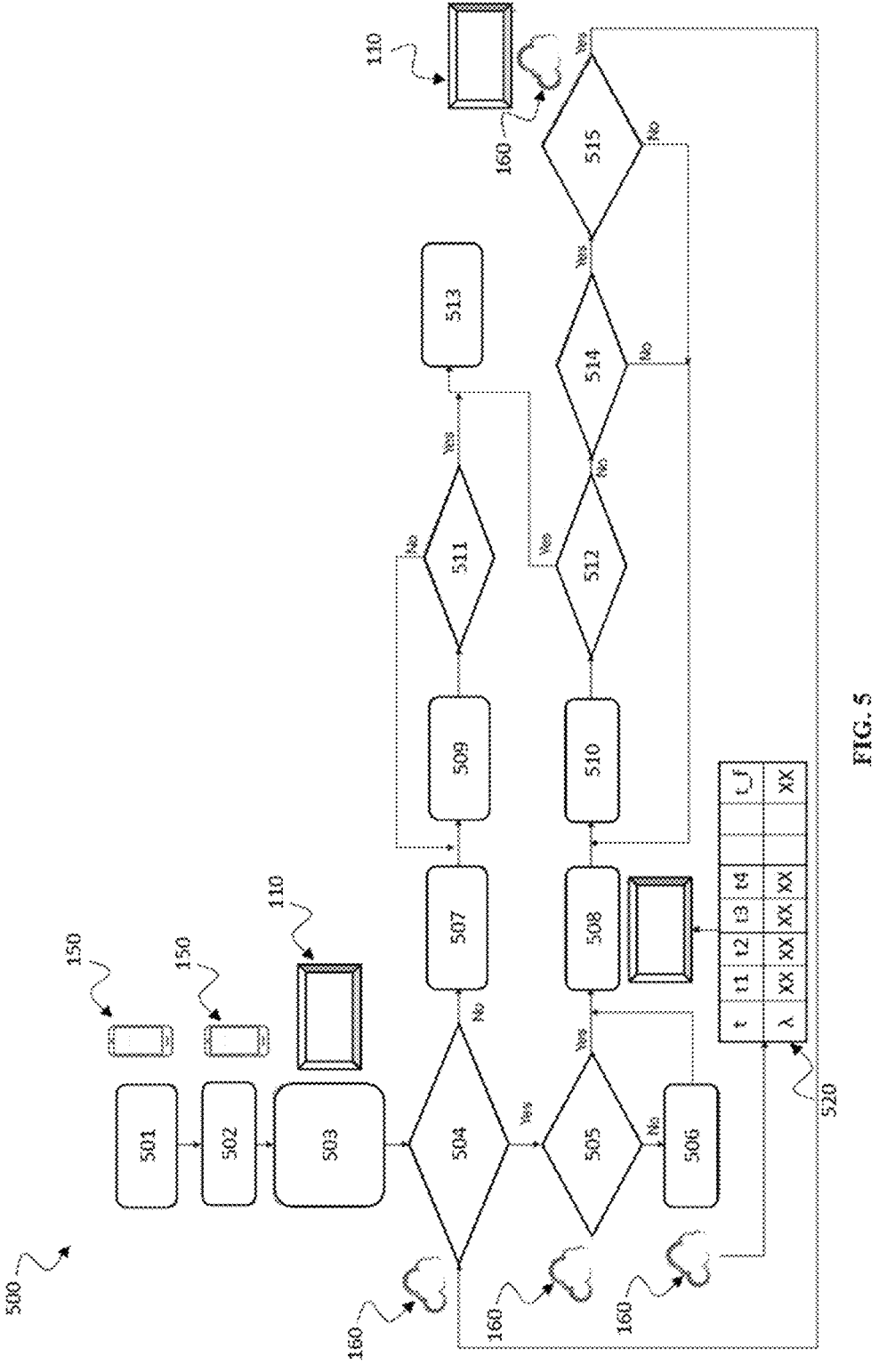
FIG. 5 shows a schematic diagram illustrating a method for solving the optimal control problem according to the disclosure.

The VCU 110 may be configured to receive the power split 133 from a memory section storing one or more predefined values, e.g., a lookup table 520 as shown in FIG. 5. The memory section is configured to store the power split 133 for successive charging times.

The VCU 110 can be configured to download the memory section from a network device of a cloud network 160 as described below.

This cloud network 160 is an external network that is located externally to the vehicle charging control system 100. A telematics-box (Tbox or T-Box) 163 located in the vehicle, or inside the vehicle charging control system 100, respectively, is configured to communicate with the network device of the cloud network 160 to transmit and/or receive data. The Tbox 163 is the control center of telematics, responsible for the remote connection control function of vehicles. The Tbox 163 may communicate with the cloud network 160 by using the telematics communication standard cellular vehicle to everything (V2X) (C-V2X) as one example.

The VCU 110 can be configured to transmit a current vehicle state 161 to the network device of the cloud network 160, e.g., via the Tbox 163, and to receive information about the power split 133 for the current vehicle state from the network device of the cloud network 160, e.g., via the Tbox 163. The current vehicle state 161 may comprise at least one of the following: the battery temperature, a charging state of the battery 120, a maximum power provided by the OBC 135, a time to departure.

The charging state of the battery, also referred to as SoC is defined as the ratio of the available capacity $Q(t)$ and the maximum possible charge that can be stored in a battery, i.e., the nominal capacity Qn. A fully charged battery has SOC 1 or 100% while a fully discharged battery has an SOC of 0 or 0%.

A maximum power provided by the charging system 130 is the highest power that can be delivered by the OBC 135 for charging battery 120 and/or heating system 140. Such maximum power is based on the design of the OBC 135.

A time to departure is the time until the user expects or desires to start his vehicle for departure, i.e., the time difference between the current time and the expected or desired departure time. Different charging systems may have different charging powers, e.g., 3 kilowatts (kW), 7 KW, 11 kW, . . . , etc.

The power split 133 may be based on a derating function of the battery 120 based on the battery temperature 111, e.g., as shown in FIG. 3.

The derating function is a function that gives a relationship between the battery temperature and the maximum charging power or current it can receive. This relationship depends on the cell chemistry and the safety margin chosen by the system designer.

The power split 133 may be based on a voltage of the battery 120 based on a charging state of the battery 120.

The nominal voltage of a battery depends on the charging state of the battery and also on the current because of internal resistance and capacitance of the battery. When the battery is fully charged, the voltage provided by the battery can be higher than an empty battery. There is a relation between the charging state of the battery and the provided voltage of the battery which can be described by a specific function.

The power split 133 can be based on at least one of the following information, for example a battery self-heating model indicating the battery temperature 111 depending on a charging current or power, a battery temperature model indicating the battery temperature 111 based on an amount of heat transferred to the battery 120, a battery voltage-to-charge model indicating an open circuit voltage of the battery 120 versus a charging state of the battery 120, and a power consumption model indicating a power consumption of the heating system 140 versus a heat 143 generated by the heating system 140.

The VCU 110 may be configured to transmit a first signaling message 112 to the OBC 135. This first signaling message 112 may indicate the first part 131 configured for charging the battery 120.

The VCU 110 may be configured to transmit a second signaling message 113 to the thermal controller 142. This second signaling message 113 may indicate the second part 132 configured for heating the battery 120.

The VCU 110 may be configured to receive a third signaling message from the BMS 121. This third signaling message may indicate the battery temperature 111.

The network device of the cloud network 160 may be a computer server, for example. The network device may be configured to receive a current vehicle state 161 from the VCU 110 of the vehicle. The current vehicle state 161 may comprise battery temperature data indicative of the battery temperature 111 of the battery 120.

The network device may be configured to transmit a memory section storing one or more predefined values to the VCU, e.g., a lookup table 520 as exemplarily shown in FIG. 5, based on the battery temperature 111 compared to a temperature threshold.

The memory section, e.g., lookup table 520, may be configured to store a power split 133 for splitting a charge power 134 provided by the charging system 130.

The power split 133 indicates a split of the charge power 134 into a first part 131 configured for charging the battery 120 by the charging system 130 and into a second part 132 configured for heating the battery 120 by a heating system 140.

The term "based on the battery temperature 111 compared to a temperature threshold" means that the battery shows a derating behavior limiting the maximum charging current as can be seen in FIG. 3. The derating curve is an input to an optimization task as defined above and described in more detail below with respect to FIG. 7.

The vehicle state 161 may further comprise at least one of the following information: a charging state of the battery 120, a maximum power provided by the charging system 130 for charging the battery 120, a time to departure of the vehicle.

The power split 133 can be based on a charging policy indicating a power split based on a charging state of the battery and the battery temperature over a charging time.

The network device may be configured to determine an estimated vehicle state of the vehicle based on applying the charging policy to an initial vehicle state 161 received from the vehicle controller 110, determine a deviation between the estimated vehicle state and a current vehicle state 161 received from the VCU 110, and update the charging policy if the deviation exceeds a threshold value.

The comparison between current vehicle state and estimated vehicle state can be performed at regular time intervals, for example every 15 min as shown in FIG. 5. A new vehicle state can be received after that time interval. In one example, after 15 min the initial vehicle state may be replaced by the current vehicle state. 15 min is only one example. This can be calibrated by the system developer or system design.

FIG. 2 shows a schematic diagram illustrating an optimal power split 200 according to the disclosure.

An external charger, e.g. the EVSE 138 of the charging system 130 shown in FIG. 1, supplies a charge power 134 which is split by an optimal power splitter corresponding to the power split 133 described above with respect to FIG. 1. The charge power 134 is split into a first part 131 configured for charging the battery and into a second part 132 configured for heating the battery 120 by an external heater, e.g., the heating element 141 of the heating system 140 as shown in FIG. 1. The term "external heater" means that the heater 141 is placed external to the battery 120.

The first part 131 of the charge power 134 may be $P_{batt}=(1-\lambda) P_{charger}$, i.e., $(1-\lambda)$ times the charge power 134.

The second part 132 of the charge power 134 may be $P_{heat}=\lambda P_{charger}$, i.e., $\lambda$ times the charge power 134. Due to power conversion from electric power to thermal power, the efficient thermal power for heating the battery may be $\alpha P_{heat}$, where a is between 0 and 1.

The optimal splitting problem can be formulated as an optimal control problem whose goal is to find an optimal power split $\lambda$ of the charge power supplied by the OBC 135 between power 131 provided to the battery 120 for charging and power 132 consumed by the thermal system 141 to provide heat to the battery 120 as depicted in FIG. 2.

The mathematical formulation of the optimal control problem can be summarized as follows:

$$\text{State} - \text{vector } x = \begin{pmatrix} x_1 \\ x_2 \end{pmatrix} = \begin{pmatrix} SoC \\ T \end{pmatrix}$$

$$\dot{x}_1 = S\dot{o}C = \frac{(1-\lambda)P_{charger}}{V_{batt}(x_1) \cdot Q[\text{Ah}] \cdot 3600}$$

$$\dot{x}_2 = \alpha P_{heat}(t) + \beta \, P_{batt}(t) = P_{charger}(\alpha \cdot \lambda + \beta \cdot (1-\lambda))$$

$$\lambda \in \left[ 1 - \frac{V_{batt}(x_1) \cdot I_{batt,lim}(x_2)}{P_{charger}}, 1 \right]$$

$I_{batt,lim}(x_2) \to$ Derating function based on temperature $V_{batt}(x_1) \to$ Battery voltage based on $SoC$ Cost function $J = 100\% - x_{1,f}$ (achieve the highest $SoC$ at the end of charging)

Optimal Control Problem $\min_{\lambda} J$, where SoC denotes the state of charge of the HV battery, T represents the average temperature of the HV battery, or the minimum cell temperature of the battery, the derivative of SoC is the time derivative of the SoC, a corresponds to the variable factor for heat transfer from heating element to the HV battery, $\beta$ corresponds to the variable factor for battery self-heating when getting charged, $V_{batt}$ denotes the battery voltage based on SoC, $I_{bat\_max}$ denotes the HV battery current derating curve based on temperature.

The cost function J models the difference between full battery SoC (100%) and the final SoC at the end of the charging session.

As an algorithm to solve the optimal control problem, dynamic programming can be used which enables the search of a global optimum using a variable control input A. A discretization of the algorithm may be necessary to reflect the computing steps and the discrete nature of the communication signals within the system. The steps to be taken to apply this algorithm on the treated problem are exhibited in the flowchart shown in FIG. 4.

FIG. 3 shows a schematic diagram illustrating two examples 301, 302 of power derating characteristics 300 for HV battery with respect to temperature.

The derating model of the battery 120 describes the maximum charge current based on battery temperature. A first curve 301 represents a first derating model of a first derating type (I). A second curve 302 represents a second derating model of a second derating type (II). The first curve 301 is an example with a step-like profile, while the second curve 302 is an example with a continuous profile such as a monotonously increasing profile.

FIG. 3 shows two temperature thresholds 303, 304, a first temperature threshold 303 that represents the minimum temperature for allowing charging, and a second temperature threshold 304 that represents the temperature for allowing charging without derating.

The derating model determines the maximum current that the battery can receive. If the temperature of the battery changes, the maximum amount of current it can receive will change based on the derating curve.

The derating curves 301, 302 shown in FIG. 3 illustrate two examples of the derating function which is a function that gives a relationship between the battery temperature and the maximum charging power or current it can receive. This relationship depends on the cell chemistry and the safety margin chosen by the system designer.

Figure 4:
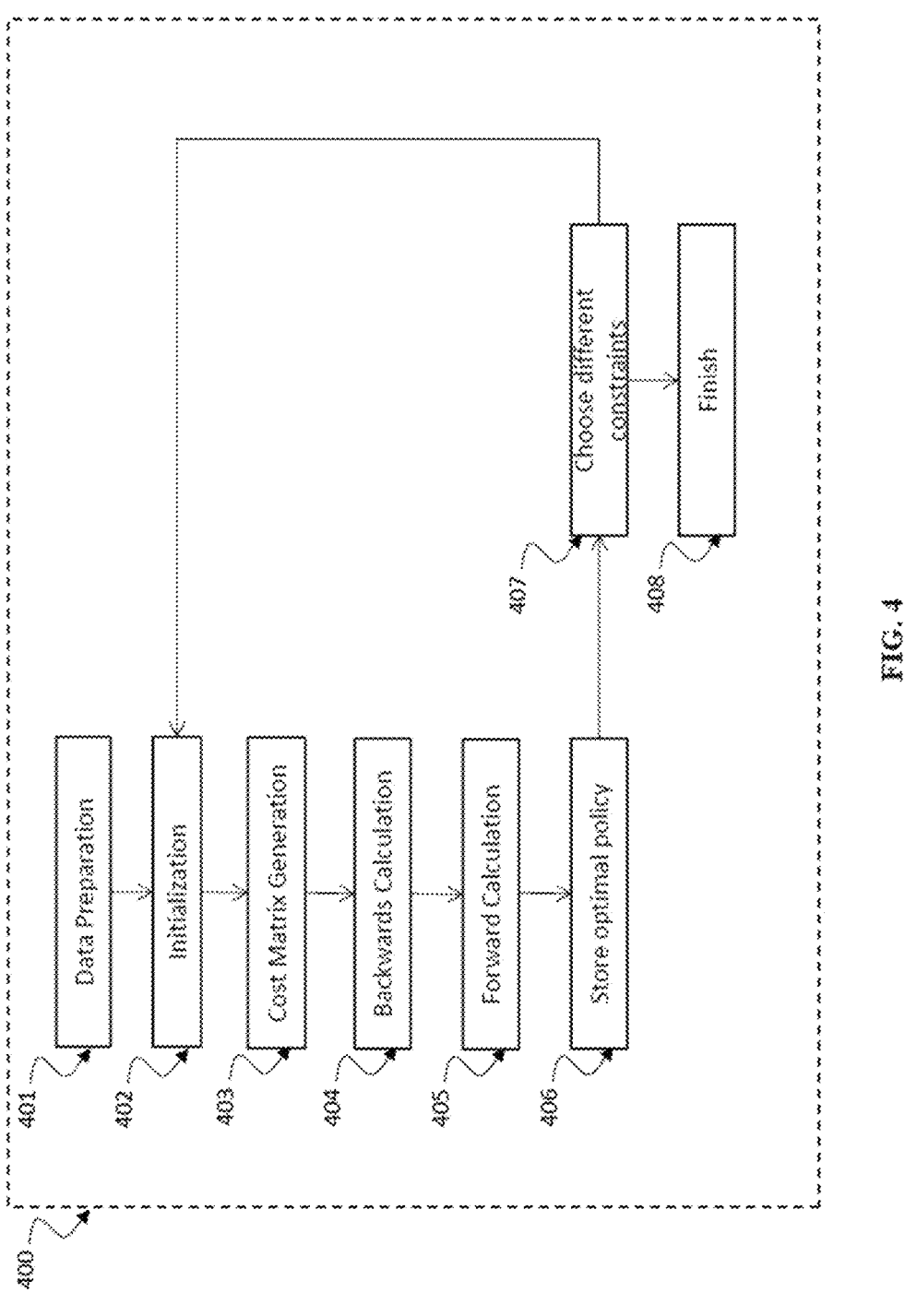
FIG. 4 shows a schematic diagram illustrating an exemplary algorithm for solving the optimal control problem according to the disclosure.

FIG. 4 shows a schematic diagram illustrating an exemplary algorithm 400 for solving the optimal control problem according to the disclosure.

The algorithm 400 starts with a first block 401 of data preparation including the following functionality: SoC versus OCV versus HV battery temperature, HV battery temperature versus heating power, $\alpha$-curves, $\beta$-curves, power consumption of thermal system versus heat generation.

Then, at second block 402, initialization is performed, i.e., initialization of OBC maximum power and time constraints.

At next third block 403, cost matrix generation is processed, i.e., for every control input $\lambda$, transition cost from state k to state k+1 are calculated.

At next fourth block 404, backwards calculation is performed, i.e., choosing the optimal control $\lambda$ from state k+1 to state k so that the cost from N to k is optimal.

At next fifth block 405, forward calculation is performed, i.e., choosing an initial state vector x and looking up optimal $\lambda$ from backwards calculation.

At next sixth block 406, optimal policy is stored in lookup table.

At next seventh block 407, different constraints are chosen with respect to OBC maximum power and time constraints.

When all initialization conditions are treated, the algorithm 400 finishes at block 408, otherwise, the algorithm jumps back to the second block 402 for performing a new initialization of OBC maximum power and time constraints.

This algorithm 400 provides the following advantages: global optimality of the optimal control solution, applicability independent from OBC maximum power, battery chemistry, thermal system type, and extendibility to multi-objective optimization. For example, optimizing final temperature with boundary conditions on SoC, and cost function with different weighting factors for final SoC and final temperature.

FIG. 5 shows a schematic diagram illustrating a method 500 for solving the optimal control problem according to the disclosure. The method can be represented by the functional blocks shown in FIG. 5 as described in the following.

At the beginning, in a first block 501, the user selects "remote charging" or any similar function, and inputs "departure time" via the user interface 150, e.g., a smartphone or any other control device. The user interface 150 corresponds to the user interface 150 shown in FIG. 1. The departure time specifies the desired departure time for starting the battery of the vehicle.

In a second block 502, the user selects "optimized charging feature" or any similar function via the user interface 150.

In a third block 503, the vehicle wakes up and starts communication of current vehicle states such as SoC, battery temperature, OBC maximum power, EVSE maximum power with the VCU 110.

In a fourth block 504, the method 500 checks whether initial conditions are requiring an optimized charging strategy if the temperature is below a temperature threshold. That means it is checked if the battery is cold and cannot be charged by the maximum charging rate.

If this is not the case, in a next block 507, a default charging strategy is applied by the VCU 110. Then, in block 509 charging and/or heating is processed according to the default strategy.

In the next block 511, the method 500 checks whether a finish charging time is reached, e.g., an ending time for the charging process that may be specified by the default strategy. If this finish charging time is not reached, the method 500 jumps to block 509 for continuing with charging and/or heating according to the default strategy. If this finish charging time is reached, charging is finished in block 513.

If in block 504, it is detected that the temperature is below the temperature threshold, the method performs next block 505 where it is checked if the initial conditions are already stored as lookup tables in the cloud 160.

If this is not the case, in next block 506, an artificial intelligence (AI) based regression is performed to obtain the optimal policy based on initial conditions.

After block 504 has been processed or after blocks 504 and 506 have been processed, the method 500 continues with block 508, where VCU 110 downloads the optimal policy from the cloud 160. This optimal policy can be received from the cloud 160, i.e., a network device in the cloud network 160 by requesting or accessing a lookup table 520 or memory section as described above with respect to FIG. 1, where this optimal policy is stored. The optimal policy may be stored in form of a table with time values, e.g., t1, t2, t3, t4, . . . , t_f and corresponding power split values λ. Exemplary time intervals are 1 minute, 2 minutes, 5 minutes, 10 minutes, 15 minutes, 30 minutes or any other time values.

After the optimal policy is downloaded in block 508, in next block 510 the charging and/or heating process is started according to the optimal policy.

In the next block 512, the method 500 checks whether the finish charging time is reached. If this finish charging time is reached, charging is finished in block 513. If this finish charging time is not reached, the method 500 continues with block 514 where it is checked whether time for comparison is reached, e.g., every 15 minutes.

If this time for comparison is not reached, the method jumps back to block 510 and continues performing the charging and/or heating according to the optimal policy. Otherwise, if this time for comparison is reached, the method continues with block 515, where it is checked whether a big difference is detected between current vehicle states and estimated vehicle states in the cloud. A big difference is a difference that exceeds a predetermined threshold with respect to one or more vehicle states.

If no big difference is detected, the method 500 continues with block 510 performing the charging and/or heating according to the optimal policy. If a big difference is detected, the method 500 jumps back to block 504 where the method 500 checks whether initial conditions are requiring an optimized charging strategy.

Referring to FIG. 5, the basic concept described in this disclosure can be summarized by the following items:
1) Solving the optimal charging at low temperature problem offline, e.g., by a network device in the cloud network 160.
2) Storing the solutions of different initial conditions (start SoC, start temperature) and different constraints (OBC maximum power, time until departure) in the cloud 160 in form of a time-series of λ values 520.
3) The cloud 160 has computing capability for regression operations in case the current state of the vehicle is not stored, as in block 506. In one example, an optimal policy is stored for an initial temperature of –30° C., an initial SoC of 50%, an initial temperature of –35° C., an initial SoC of 50%, A current vehicle state corresponds to an initial temperature of –33° C. and an initial SoC of 50%. Then, regression of the optimal solution for the data point –33° C. and 50% SoC can be performed.
4) The EV owner can choose the option of optimized charging at low temperature remotely, e.g., by an App on a mobile device, and can set the desired departure time via user interface 150.
5) The VCU 110 transmits the current vehicle states such as SoC, battery temperature, OBC maximum power, time to departure, etc. to the cloud 160.
6) The cloud 160 or the VCU 110 evaluate whether the temperature conditions require the deployment of the optimized charging strategy, as in block 504.
7) If yes, the cloud 160 evaluates if an optimal policy is stored for the vehicle states, if not an approximation through regression takes places, based on the data points stored in the cloud 160.
8) The cloud 160 downloads the policy to the VCU 110 in the format of time stamps with the according control input A.
9) The VCU 110 adopts the downloaded policy and deploys it on the real system.
10) Every 15 minutes (or any other predetermined time interval), the cloud 160 compares the real system behavior and the estimated one. In case of discrepancy, the cloud 160 looks-up the optimal policy corresponding to the current vehicle states and updates the policy transmitted to the VCU 110.
11) If the current vehicle states do not require the deployment the optimized charging strategy, a default strategy is used, e.g., charging at the maximum battery charge current.
12) The charging session ends if the charging exit conditions are met. For example, the final SoC reached, the final time is reached or a fault in the charging system occurs.

Figure 6:
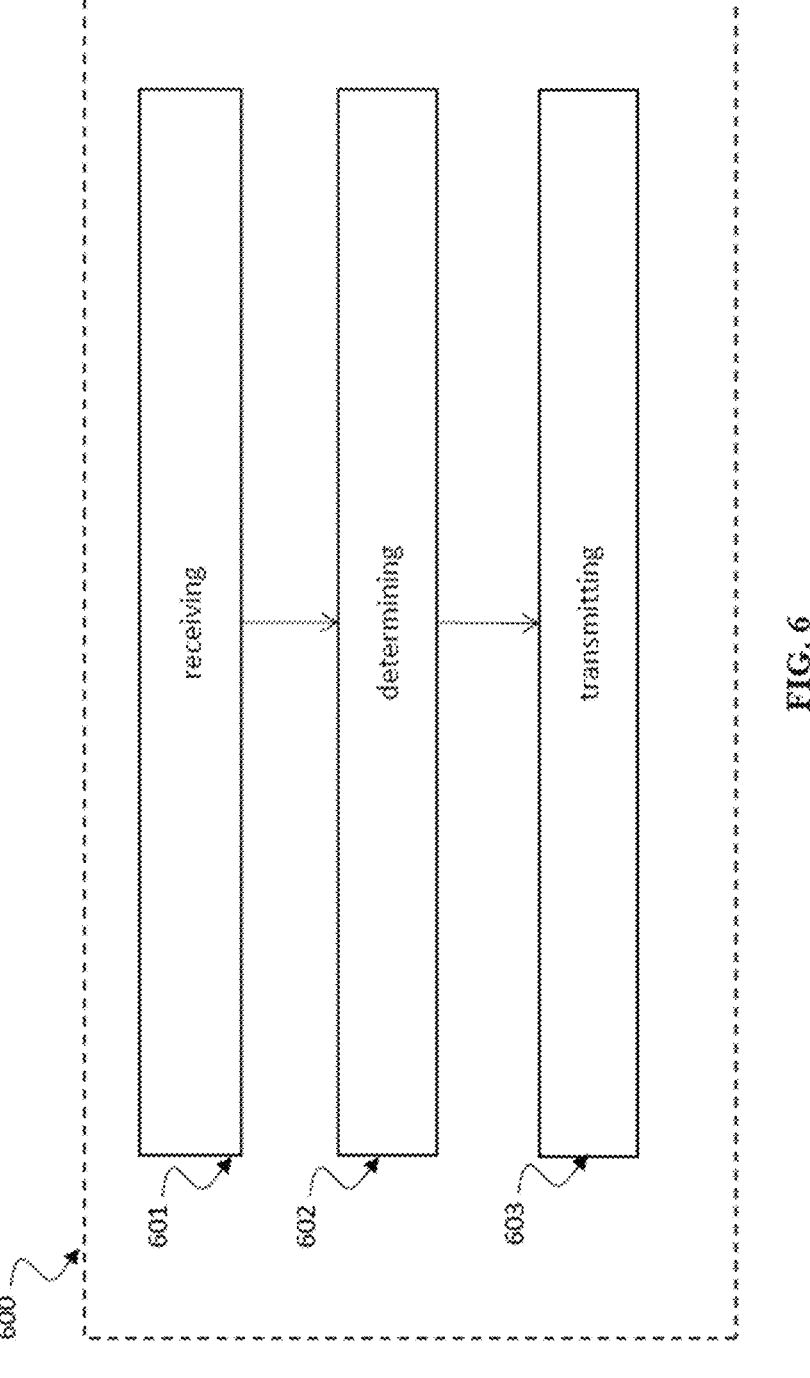
FIG. 6 shows a schematic diagram illustrating a method for power management of a vehicle according to the disclosure.

FIG. 6 shows a schematic diagram illustrating a method 600 for power management of a vehicle according to the disclosure.

The method 600 comprises receiving 601 battery temperature data, the battery temperature data being indicative of a battery temperature of a battery of the vehicle, e.g., as described above with respect to FIG. 1.

The method 600 comprises, based on the battery temperature compared to a temperature threshold, determining 602 a power split for splitting a charge power provided by a charging system, wherein the power split indicates a split of the charge power into a first part configured for charging the battery by the charging system and into a second part configured for heating the battery by a heating system, e.g., as described above with respect to FIG. 1.

The method 600 comprises transmitting 603 information about the first part of the charge power to the charging system and information about the second part of the charge power to the heating system, e.g., as described above with respect to FIG. 1.

Figure 7:
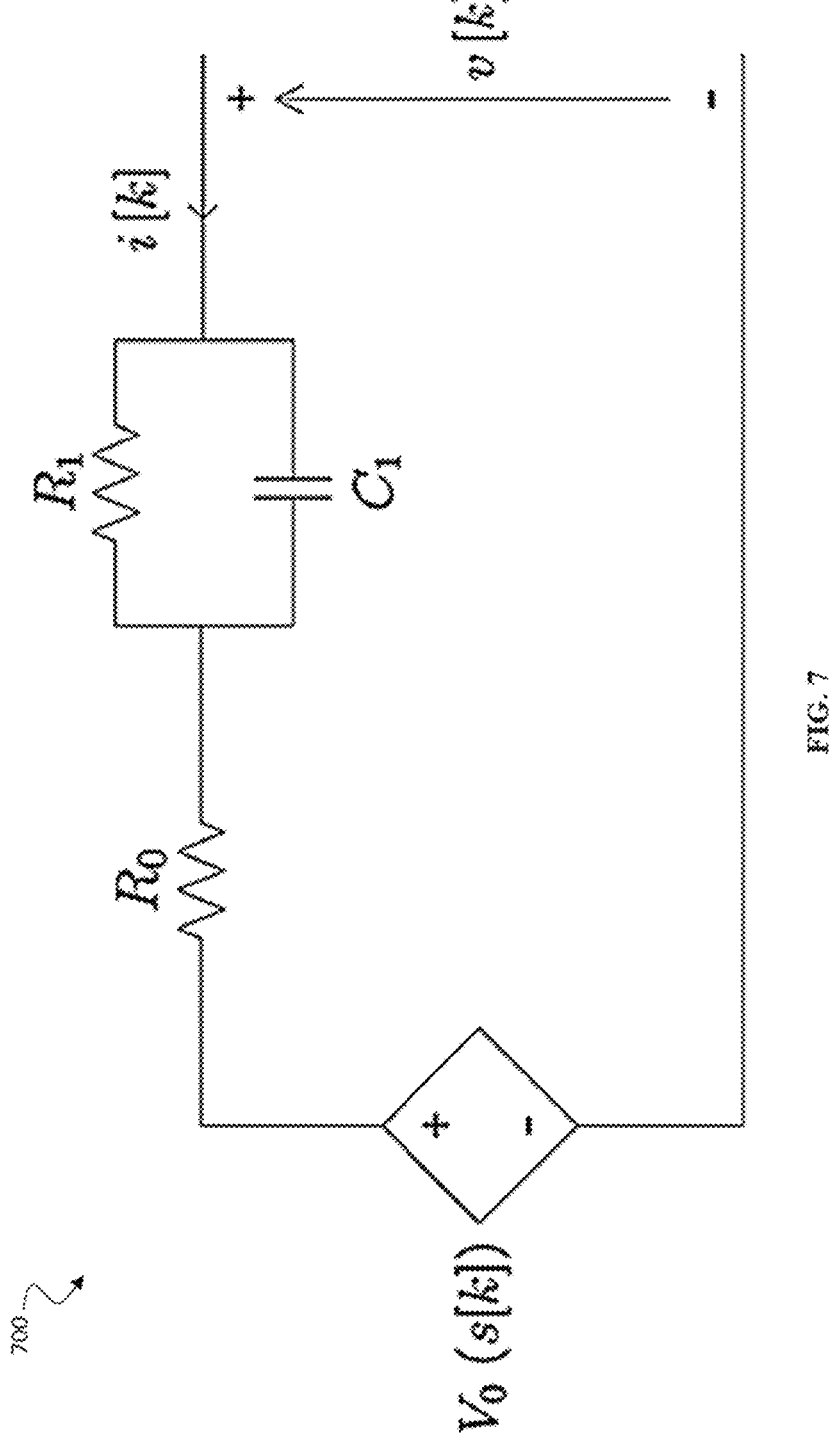
FIG. 7 shows a circuit diagram illustrating an electrical model for deriving a charging policy for an optimal splitting of the charge power according to the disclosure.

FIG. 7 shows a circuit diagram illustrating an electrical model for deriving a charging policy for an optimal splitting of the charge power according to the disclosure.

The electrical model is represented by an electrical circuit 700 comprising a first resistor $R_0$ which first terminal is connected in series with a parallel connection of a second resistor R; and a capacitor $C_1$. A second terminal of the first resistor $R_0$ is connected to a voltage source $V_0$ (s[k]). The current through the electrical circuit 700 is referred to as i[k] and the voltage across the electrical circuit 700 is referred to as v[k].

For solving the optimization problem and thus finding the optimal charging strategy as described above with respect to FIG. 2, the following equations need to be solved for every time step:

A) Three-State Dynamic Programming (DP) with Current i[k] as Control (Non-Linear System):

$$\begin{pmatrix} V_1[k+1] \\ s[k+1] \\ \theta[k+1] \end{pmatrix} =$$

$$\begin{pmatrix} e^{-\frac{\Delta t}{\tau}} & 0 & 0 \\ 0 & 1 & 0 \\ \frac{mc}{hA-i[k]\frac{\partial V_0}{\partial T}}\left(1-e^{-\frac{hA-i[k]\frac{\partial V_0}{\partial T}}{mC_p}}\right)\frac{i[k]}{mc} & 0 & e^{-\frac{hA-i[k]\frac{\partial V_0}{\partial T}}{mC_p}} \end{pmatrix}\begin{pmatrix} V_1[k] \\ s[k] \\ \theta[k] \end{pmatrix} +$$

$$\begin{pmatrix} R_1\left(1-e^{-\frac{\Delta t}{\tau}}\right) \\ \frac{\Delta t}{3600Q} \\ -\frac{R_0i[k]\left(1-e^{-\frac{hA-i[k]\frac{\partial V_0}{\partial T}}{mC_p}}\right)}{hA-i[k]\frac{\partial V_0}{\partial T}} \end{pmatrix}i[k] + \begin{pmatrix} 0 \\ 0 \\ \frac{\left(1-e^{-\frac{hA-i[k]\frac{\partial V_0}{\partial T}}{mC_p}}\right)}{hA-i[k]\frac{\partial V_0}{\partial T}}(hA\theta_{amb}+\eta_hP_h) \end{pmatrix}$$

B) Electrical Model:

$$\begin{cases} v = V_O - R_0 i - v_1 \\ \dot{v}_1 = -\frac{v_1}{\tau} + \frac{1}{C_1}i \end{cases} \Rightarrow$$

$$\begin{cases} v[k] = V_O(s[k]) - R_0[k]i[k] - v_1[k] \\ i_1[k] = \left[1-\left(\frac{1-e^{-\frac{\Delta t}{\tau}}}{\frac{\Delta t}{\tau}}\right)\right]i[k] + \left[\left(\frac{1-e^{-\frac{\Delta t}{\tau}}}{\frac{\Delta t}{\tau}}\right)-e^{-\frac{\Delta t}{\tau}}\right]i[k-1] + e^{-\frac{\Delta t}{\tau}}i_1[k-1] \end{cases}$$

C) Thermal Model:

$$mC_p\frac{d\theta}{dt} = i(V_O - V) + i\theta\frac{\partial V_O}{\partial \theta} + \eta_{heater}P_{heater} + hA(\theta - \theta_{amb}) \text{ OR}$$

D) Derating Model:

$$i_{max} = f(\theta) \text{ and } i[k] < i_{max}[\theta[k]]$$

E) Cost Function:
J=100%−s[Nf] where Nf is the length of optimization horizon which corresponds to final time.

The algorithm can then minimize the cost functions and determine the optimal currents i[k].

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the disclosure. This disclosure is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the disclosure has been described with reference to one or more particular embodiments, those skilled in the art recognize that many changes may be made thereto without departing from the scope of the disclosure. It is therefore to be understood that within the scope of the appended claims and their equivalents, the disclosure may be practiced otherwise than as described herein.

What is claimed is:
1. A vehicle controller configured to:
receive battery temperature data indicating a battery temperature of a battery of a vehicle;
determine, based on a comparison of the battery temperature to a temperature threshold, a power split for splitting a charge power from a charging system, wherein the power split indicates a split of the charge power into a first part for charging the battery by the charging system and a second part for heating the battery by a heating system, wherein the power split is based on a charging policy stored in a memory, and wherein the charging policy indicates the power split based on a charging state of the battery and the battery temperature over a charging time;
transmit, to the charging system, first information about the first part;
transmit, to the heating system, second information about the second part; and
control the battery based on the first information and the second information to regulate the charging state of the battery and maintain an optimal temperature.

2. The vehicle controller of claim 1, wherein the power split comprises a power split factor indicating the first part and the second part.

3. The vehicle controller of claim 1, wherein the charging policy is precomputed offline and stored in the memory as a lookup table, and wherein the lookup table stores power split values indexed by successive charging times.

4. The vehicle controller of claim 3, wherein the power split is further based on at least one of:

a thermal model of the battery;

a derating model of the battery;

a power consumption model of the heating system;

a relationship between heat from the heating system and a corresponding power consumption; or an electrical model of the battery.

5. The vehicle controller of claim 3, wherein the vehicle controller is further configured to obtain, based on the charging policy, a maximum charging state of the battery over a charging time interval.

6. The vehicle controller of claim 1, wherein the vehicle controller is further configured to receive the power split from a lookup-table storing one or more predefined values and the power split for successive charging times.

7. The vehicle controller of claim 6, wherein the vehicle controller is further configured to download, from a network device of a cloud network, the lookup-table.

8. The vehicle controller of claim 7, wherein the vehicle controller is further configured to:

transmit, to the network device, a current vehicle state, wherein the current vehicle state comprises at least one of the battery temperature, a charging state of the battery, a maximum power from the charging system, or a time to departure of the vehicle; and receive, from the network device, the lookup-table for the current vehicle state.

9. The vehicle controller of claim 1, wherein the power split is based on a derating function of the battery, and wherein the derating function is based on the battery temperature.

10. The vehicle controller of claim 1, wherein the power split is based on a voltage of the battery, and wherein the voltage is based on a charging state of the battery.

11. The vehicle controller of claim 1, wherein the power split is based on at least one of:

a battery self-heating model indicating that the battery temperature depends on a charging current or power;

a battery temperature model indicating that the battery temperature is based on an amount of first heat transferred to the battery;

a battery voltage-to-charge model indicating an open circuit voltage of the battery versus a charging state of the battery; or a power consumption model indicating a power consumption of the heating system versus an amount of second heat from the heating system.

12. A vehicle charging control system comprising:

an on-board charger configured to convert alternating current (AC) power into direct current (DC) charge power for charging a battery of a vehicle;

a heating system comprising:

a heating element for heating the battery; and a thermal controller configured to control a heating power of the heating element; and a vehicle controller configured to:

receive battery temperature data indicating a battery temperature of the battery;

determine, based on a comparison of the battery temperature to a temperature threshold, a power split for splitting the DC charge power, wherein the power split indicates a split of the DC charge power into a first part for charging the battery by the on-board charger and a second part for heating the battery by the heating system, wherein the power split is based on a charging policy stored in a memory, and wherein the charging policy indicates the power split based on a charging state of the battery and the battery temperature over a charging time;

transmit, to the on-board charger, first information about the first part; transmit, to the heating system, second information about the second part; and control the battery based on the first information and the second information to regulate the charging state of the battery and maintain an optimal temperature.

13. The vehicle charging control system of claim 12, wherein the vehicle controller is further configured to:

transmit, to the on-board charger, a first signaling message indicating the first part; and transmit, to the thermal controller, a second signaling message indicating the second part.

14. The vehicle charging control system of claim 12, wherein the vehicle controller is further configured to receive, from a battery management system, a signaling message indicating the battery temperature.

15. The vehicle charging control system of claim 12, wherein the vehicle controller is further configured to:

transmit, to a network device of a cloud network, a current vehicle state, wherein the current vehicle state comprises at least one of the battery temperature, a charging state of the battery, a maximum power from the on-board charger, a time to departure of the vehicle; and receive, from the network device, third information about the power split for the current vehicle state.

16. A method comprising:

receiving battery temperature data indicating a battery temperature of a battery of a vehicle;

determining, based on a comparison of the battery temperature to a temperature threshold, a power split for splitting a charge power from a charging system, wherein the power split indicates a split of the charge power into a first part for charging the battery and a second part for heating the battery, wherein the power split is based on a charging policy stored in a memory, and wherein the charging policy indicates the power split based on a charging state of the battery and the battery temperature over a charging time;

transmitting, to the charging system, first information about the first part;

transmitting, to a heating system, second information about the second part; and controlling the battery based on the first information and the second information to regulate the charging state of the battery and maintain an optimal temperature.

17. A network device configured to:

receive, from a vehicle controller of a vehicle, a current vehicle state comprising battery temperature data, wherein the battery temperature data indicates a battery temperature of a battery of the vehicle; and transmit, to the vehicle controller based on a comparison of the battery temperature to a temperature threshold, a lookup-table storing one or more predefined values and a power split for splitting a charge power from a charging system to enable the vehicle controller to control the battery based on the power split to regulate the battery's state-of-charge and maintain an optimal temperature, wherein the power split indicates a split of the charge power into a first part for charging the battery by the charging system and a second part for heating the battery by a heating system, wherein the power split is based on a charging policy stored in a memory, and wherein the charging policy indicates the power split based on a charging state of the battery and the battery temperature over a charging time.

18. The network device of claim 17, wherein the current vehicle state further comprises at least one of:
a charging state of the battery;
a maximum power provided by the charging system for charging the battery; or
a time to departure of the vehicle.

19. The network device of claim 18, wherein the power split is based on a charging policy is precomputed offline and stored in the memory as the lookup table, and wherein the charging policy indicates the power split based on a charging state of the battery and the battery temperature over a charging time.

20. The network device of claim 19, wherein the network device is further configured to:
determine, based on applying the charging policy to an initial vehicle state from the vehicle controller, an estimated vehicle state of the vehicle;
determine a deviation between the estimated vehicle state and the current vehicle state; and
update the charging policy when the deviation exceeds a threshold value.

* * * * *